US006801777B2

(12) United States Patent
Rusch (10) Patent No.: US 6,801,777 B2
(45) Date of Patent: Oct. 5, 2004

(54) DEVICE AND METHOD FOR INTELLIGENT WIRELESS COMMUNICATION SELECTION

(75) Inventor: Leslie A. Rusch, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 158 days.

(21) Appl. No.: 09/995,449

(22) Filed: Nov. 27, 2001

(65) Prior Publication Data

US 2003/0100308 A1 May 29, 2003

(51) Int. Cl.[7] .............................................. H04Q 7/20
(52) U.S. Cl. ................... 455/452.2; 455/450; 455/464; 455/509; 455/552.1
(58) Field of Search .............................. 455/422.1, 440, 455/450, 451, 452.1, 452.2, 456.1, 464, 509, 524, 552.1, 553.1; 709/249; 370/338

(56) References Cited

U.S. PATENT DOCUMENTS

| 5,412,375 A | * | 5/1995 | Wood ........................ 455/451 |
| 6,259,917 B1 | * | 7/2001 | Elzein ..................... 455/435.2 |

FOREIGN PATENT DOCUMENTS

| EP | 1119137 | * | 1/2000 | ........... H04L/12/28 |
| WO | WO-9628947 | * | 9/1996 | ........... H04Q/7/38 |
| WO | WO-9929126 | * | 6/1999 | ........... H04Q/7/22 |
| WO | WO-0122662 | * | 3/2001 | ........... H04L/12/28 |
| WO | WO-0135578 | * | 5/2001 | ........... H04L/12/28 |

* cited by examiner

Primary Examiner—William Trost
Assistant Examiner—Stephen M. D'Agosta
(74) Attorney, Agent, or Firm—Schwegman, Lundberg, Woessner & Kluth, P.A.

(57) ABSTRACT

A wireless communication device includes one or more radio interfaces to communicate using various wireless protocols with different communication networks. The wireless device may, for example, be a notebook or laptop computer, a personal digital assistant (PDA), a mobile data terminal, wireless telephone, video camera or another multimedia device. A multi-channel radio controller within the wireless device characterizes available communication networks to determine network characteristics including current network information. Available communication networks and services may be characterized by monitoring traffic, using location information, interrogating or from current connectivity. A wireless connectivity assistant may select a communication network and service based on the network characteristics and at least one of user preferences, application requirements and system information.

30 Claims, 2 Drawing Sheets

DEVICE AND METHOD FOR INTELLIGENT WIRELESS COMMUNICATION SELECTION

FIELD OF THE INVENTION

The present invention pertains to wireless communications, and in particular to wireless communication devices and methods for communicating.

BACKGROUND OF THE INVENTION

Wireless communications are enabling changes of great scope and depth in our society. Remotely accessible computers and data systems are becoming more common allowing an almost unlimited amount of information to be available anywhere, anytime. Wireless data capabilities are also improving the productivity and accessibility of professionals in the field. Laptop and notebook computers equipped with radio frequency modems have enabled the formation of remotely located "virtual offices". The explosion of wireless communication has been fueled by advances in semiconductor technology and software. These advances have allowed audio and data signals to be transmitted over digital networks.

One problem with current wireless communications is that a user is typically dependent on a single radio interface which communicates over a wireless link that is easily lost when traveling out of range or in a null coverage area, or lost due to congestion. Although other communication networks may be available, the radio interface is not able to make use of these other networks. For example, a device communicating with a network utilizing a code division multiple access (CDMA) link may not be able to transition to another network such as a wireless local area network (WLAN) when the CDMA link becomes unavailable. Although some wireless devices may implement more than one transceiver for communicating with different communication networks, these devices do not readily transition between the transceivers, nor do they exhibit flexibility in assessing the worth of the network. Another problem with current wireless communications is that the network connection is not optimized for the application being used. For example, the same network connection for voice communications may not be suitable for video or data transfer.

Thus, it would be advantageous for wireless devices, including portable and laptop computers, to communicate more effectively and efficiently over the airwaves. It would also be advantageous for wireless devices to transition between communication networks when a network becomes unavailable. It would also be advantageous for wireless devices to select between available connections. It would also be advantageous for wireless devices to optimize communications for the application.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

DETAILED DESCRIPTION

The description set out herein illustrates the various embodiments of the invention and such description is not intended to be construed as limiting in any manner. The present invention relates to wireless communications and provides, among other things a wireless communication device and method for intelligent selection among available communication networks. In accordance with one embodiment, a wireless communication device includes one or more radio interfaces to communicate using various wireless protocols with different communication networks. The wireless device may, for example, be a notebook or laptop computer, a personal digital assistant (PDA), a mobile data terminal, a wireless telephone, digital camera, video camera or other multimedia device, and may include functional combinations thereof. A multi-channel radio controller within the wireless device characterizes available communication networks to determine network characteristics including current network information. Available communication networks may be characterized by monitoring traffic, using location information, interrogating networks and/or services, or from current connectivity. A wireless connectivity assistant selects a communication network based on the network characteristics, user preferences, application requirements and system information.

Figure 1:
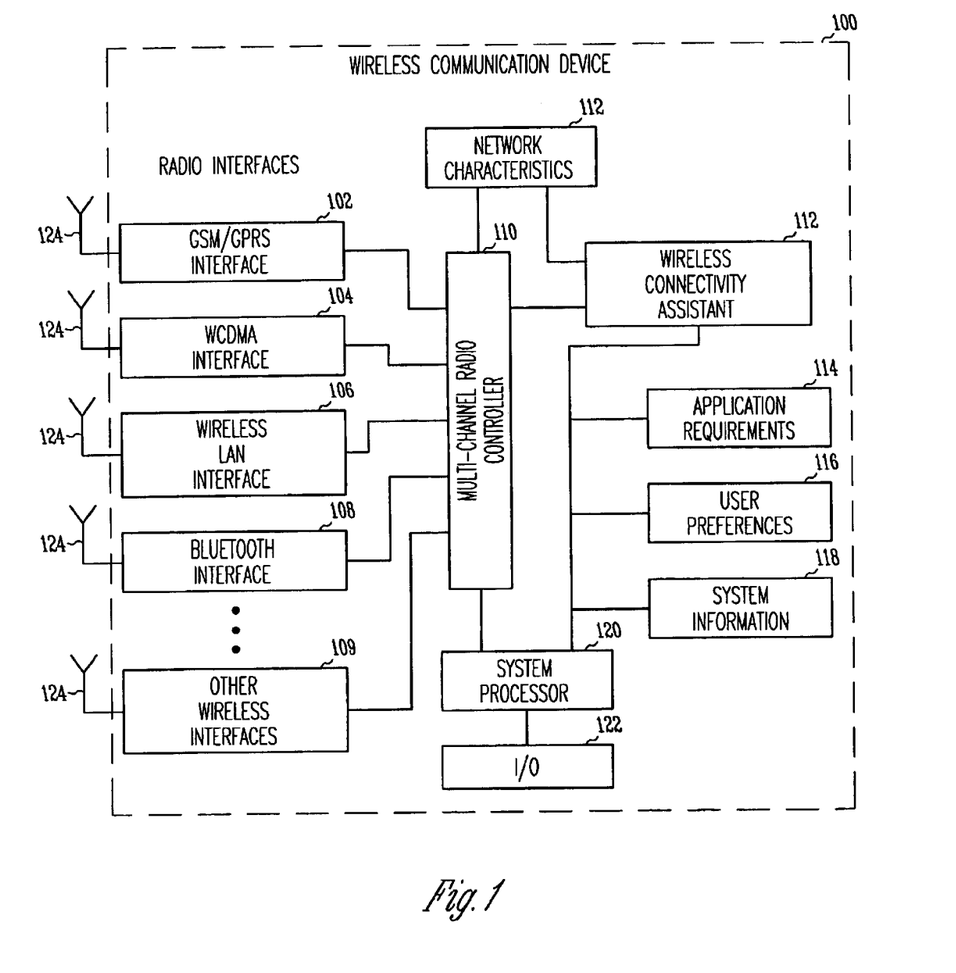
FIG. 1 is a simplified functional block diagram of a portion of a wireless communication device in accordance with an embodiment of the present invention.

FIG. 1 is a simplified functional block diagram of a portion of a wireless communication device in accordance with an embodiment of the present invention. Wireless communication device 100 characterizes available networks to determine current network information, and may select one of the available networks based on the current network information and at least one of user preferences, application requirements and system information. Wireless communication device may be any communication device including, for example, a notebook or laptop computer, a personal digital assistant (PDA), a mobile data terminal, wireless telephone, digital camera, video camera or other multimedia device, and may include functional combinations thereof. For simplicity, all functional elements of device 100 may not be illustrated in FIG. 1.

Wireless communication device 100 may include one or more of several radio interfaces to allow communication over wireless links with various communication networks. The radio interfaces may include a packet radio interface, such as GSM/GPRS interface 102 for commutating with packet radio communication systems such as Global System for Mobile Communications (GSM) or General Packet Radio Service (GPRS) systems. The radio interfaces may also include a digital mobile radio interface such as Wideband Code Division Multiple Access (WCDMA) radio interface 104. The radio interfaces may also include wireless local area network (LAN) interface 106 for communicating in accordance with wireless LAN standards such as IEEE 802.11(a) and 802.11(b). The radio interfaces may also include a short-range wireless interface such as Bluetooth interface 108 for communicating with PC's, mobile phones and other portable devices in accordance with a short range digital communication protocol such as Bluetooth. Bluetooth wireless technology is a de facto standard, as well as a specification for small-form factor, low-cost, short range radio links between mobile PCs, mobile phones and other portable devices. The radio interfaces may also include an ultra-wideband (UWB) interfaces where no carrier is used. Wireless device 100 may also include other radio interfaces 109, which may, for example, be an ultra-wideband (UWB) interface which use no carrier, an analogue RF interface or an optical interface. Although device 100 is illustrated with several interfaces 102–109, nothing requires that device 100 include all interfaces.

In one embodiment of the present invention, one or more of the radio interfaces may include software radio interfaces or modules. In this embodiment, a software radio interface may be a software radio configurable with software to allow the radio interface to be used/reused for different radio links. For example, rather than a radio interface having separate hardware for different communications (e.g., WCDMA and 802.11) packaged in one interface, a software radio interface may have components configured or configurable to adopt the characteristics of the different communication requirements.

The radio interfaces provide the RF or optical front-end functionality for communicating over a wireless link with a selected communication network. The radio interfaces receive digital signals from multi-protocol radio controller 110, and may modulate the signals on a suitable carrier frequency. The radio interfaces also may demodulate signals received from antennas 124 and send a digital signal to radio controller 110. In the case of UWB communications, modulation and demodulation to and from a carrier frequency may not be performed. Radio controller 110 configures the information in accordance with an appropriate protocol for the communication link.

The radio interfaces are illustrated as functionally separate units for ease in understanding the present invention, however any one or more may be combined as a single unit. Furthermore, although radio controller 110 is illustrated as a separate functional element from the radio interfaces, some of the functionality of radio controller 110 may be performed by the radio interfaces. For example, some processing specific to a particular protocol may be performed by a radio interface. In accordance with one embodiment, radio interfaces may be added or removed from device 100, and device 100 may include slots adapted to receive additional radio interfaces. In accordance with another embodiment, one or more radio interfaces may be fabricated along with controller 110 as a separate module, circuit board or add-on card for use in device 100.

Multi-protocol radio controller 110 may be comprised of one or more processors configured with firmware and software to interface with wireless connectivity assistant 112 and system processor 120. Based on instructions and control signals from wireless connectivity assistant 112, radio controller 110 utilizes radio interfaces to characterize available networks and determine current network and service information. Current network and service information for an available network may include the services available (e.g., packet radio, digital voice, data), protocol requirements (e.g., IEEE 802.11(a)/(b), TCP/IP, IPSec), quality of service (e.g., average bit-rate, packet latency and bit-error-rate), bit-rates available for a particular protocol, network congestion, cost of a particular service, power consumption, location information (e.g., distance to receiver) and available security (e.g., virtual private network (VPN) capability, encryption type, encryption level). Bit-rate, as used herein may include a nominal bit-rate (i.e., the available bit-rate), an instantaneous bit-rate (i.e., the number of bits transmitted in the time of a packet), an average bit-rate (i.e., judging the number of packets to be transmitted or retransmitted over a period of time), or effective bit-rate (a bit-rate that factors in other factors such as dropped packets).

Controller 110 may also query a service when multiple services are hosted by a network. For example, the same network may provide voice service, internet access, data service without internet access, a premium data service with better quality of service, subscription access, a public access service with a fee per use, a licensed access service for client corporations, etc. Controller 110 may query both the network and the service to determine the network and service characteristics. Some services may have characteristics such as quality of service guarantees such that for some links, the quality of service may be function of factors such as network congestion, link quality, etc. Guarantees for quality of service may be associated with higher costs and an allocation of greater network assets, such as additional bandwidth.

In characterizing the available communication networks and/or services, radio controller 110 may utilize one or more of the radio interfaces to monitor communications (e.g., traffic and signals) from one of the available communication networks. In this embodiment, the monitored communications may be used to identify available communication networks and/or services as well as used to determine how busy a particular network and/or service is and to help identify available channels or available bandwidth for the particular network and/or service.

Radio controller 110 may also interrogate an available communication network and/or service to determine current network information and network characteristics. For example, radio controller 110 may cause one or more of the radio interfaces to send an interrogation signal requesting network characteristics and current network information. Interrogation may include requests for information as well as requests for service. In a request for service, a connection may be established to ascertain information and/or have a back-up link in case an active link is dropped inadvertently. In one embodiment, the power required to maintain a back-up link may be considered.

In one embodiment, radio controller 110 may use geographic location information to determine the characteristics of available communication networks. For example, device 100 may have the characteristics of various communication networks available for various geographic locations stored in a memory. The geographic location of communication device 100 may be calculated and the characteristics of the available communication may be determined. A global positioning system (GPS) receiver (not shown) may be used to determine the geographic location of device 100, or alternatively, signals from transmitters of one or more of the communication networks may be used to determine location (e.g., by triangulation). Additionally, location information may be used to determine proximity to network transmitters/receivers to determine some of characteristics that may affect communications. For example, a greater distance to a network's transmitter/receiver may require more transmission power by device 100, and/or may result in a lower signal-to-noise ratio or higher bit-error-rate.

In some situations, communication links may exist within the same frequency band (e.g., Bluetooth, 802.11b and Home-RF). In these situation, controller 110 may determine how much a link is degraded due to the presence of a competing system in the same frequency band providing more complete information on the available communication options. For example, although the controller may identify an 802.11b system, it may be unusable due to a close proximity of a Bluetooth system. Alternatively, the 802.11b system may be utilized, for example, when the Bluetooth system is not being used or is in a "sleep" mode.

The network characteristics and current network information is accumulated by controller 110 for use by wireless connectivity assistant 112. Radio controller 110 may store current network information and characteristics for the available networks and/or services in storage element 111. Wireless connectivity assistant 112 may be a software agent running on device 100 (e.g., on system processor 120) to interface between applications and the radio interfaces. Wireless connectivity assistant 112 may select one of the available networks for communicating based on the current network information and characteristics of the available networks and/or services stored in element 111, application requirements stored in element 114, user preferences stored in element 116, and system information stored in element 118. Elements 111, 114, 116 and 118 are illustrated as separate elements to facilitate the understanding of the invention, however one or more physical storage locations accessible by wireless connectivity assistant 112 may be utilized.

Application requirements stored in element 114 are the requirements a particular software application may require for communicating with a network, and may include requirements for communicating over a wireless link. Application requirements may include, for example, bit-rate requirements, quality of service requirements, connectivity continuity requirements and privacy/security requirements. Application requirements may also include, latency and bit-rate information for a particular applications. For example, voice communication may require lower latency and a lower bit-rate that video conferencing which may require a higher bit-rate and a higher latency. Video playback, on the other hand, may be more tolerant on latency. Applications may include software for email communications, video conferencing, data transfer, internet access, audio transfer, teleconferencing and voice conversations.

System information stored in element 118 includes information about the elements of device 100 that are relevant to network communications. In general, system information may include system requirements as well as system constraints as well as other system related information. For example, system information may include battery/power characteristics, video display characteristics, processing abilities and processing speed, privacy requirements, camera resolution, and audio characteristics (e.g., speaker and/or headphone quality). Among other things, system information may be used by connectivity assistant 112 to help select an available communication network, service and protocol for communicating. For example, video quality in excess of what the video display is capable of displaying (or may be configured to display) need not be obtained, and therefore a higher bit-error rate or lower signal-to-noise ratio may be acceptable. System information may also, for example, include a window size for which a video may run allowing connectivity assistant to select lower bit-rates when the window size is small.

User preferences stored in element 116 may include a user's preferred communication carrier, quality preferences, power constraints, and privacy preferences. The user's quality preferences may include different quality of service tolerances and/or preferences for different types of communications and may vary depending on the particular application. For example, the user may prefer a more stable lower-quality video over a less stable higher-quality video; the user may prefer that lower power communications be selected if he/she relies heavily on battery power; or the user may prefer lower cost communications or a particular carrier or service provider for certain types of communications. User preferences may, for example, indicate that when the battery is low, the user desires communication links requiring lower power or that links with increased bit-error-rates are acceptable. In one embodiment, user preferences may be stored in a memory element such as a smart card or token which may be inserted into device 100. User preferences may be input by user through I/O 122. Wireless connectivity assistant 112 pulls together the user preferences, application requirements, and system information to make an intelligent selection among the available communication networks. Desirably, wireless connectivity assistant 112 operates without user intervention providing the user with a more gratifying wireless communication experience.

In accordance with one embodiment, controller 110 interprets commands from applications and may switch between wireless links of various networks in response to changing conditions (e.g., link degradation, increased network congestion) or changing application requirements (e.g., a new or current application requires additional bandwidth). Controller 110 also may maintain one or more wireless links with a network and permits the simultaneous communication with several networks with concurrently running applications. Accordingly wireless device 100 need not be dependent on one wireless link with any one network.

In one embodiment where the wireless device is a multimedia device, such as a video camera, for example, with limited storage capability, the video data may be sent to a remote location having additional storage capacity, such as the user's home. In this embodiment, the multimedia device may include the wireless capabilities described herein or may be coupled with a wireless communication device.

Figure 2:
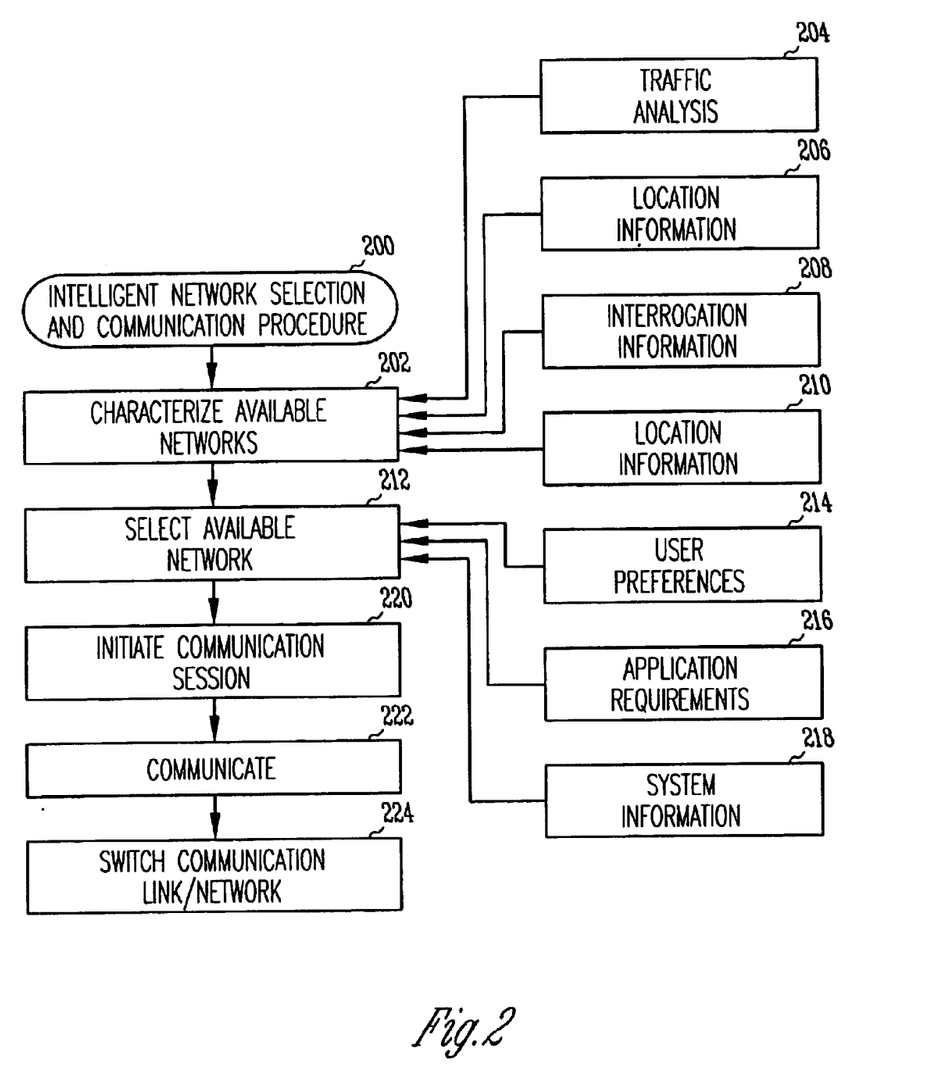
FIG. 2 is a flow chart of an intelligent network selection and communication procedure in accordance with an embodiment of the present invention.

FIG. 2 is a flow chart of an intelligent network selection and communication procedure in accordance with an embodiment of the present invention. Procedure 200 may be performed by device 100 (FIG. 1) or may be performed by another wireless communication device suitably configured. Although the individual operations of procedure 200 are illustrated and described as separate operations, it should be noted that one or more of the individual operations may be performed concurrently. Further, nothing necessarily requires that the operations be performed in the order illustrated. Procedure 200 characterizes available networks and/or services to determine current network information and selects one of the available networks based on the current network and service information, and at least one of user preferences, application requirements and system information.

Operation 202 characterizes the available networks and/or services to determine network characteristics and current network and service information. Operation 202 may utilize traffic analysis information 204, location information 206, interrogation information 208 and current connection information 210. Operation 202 may be performed, for example, by multi-channel radio controller 110 (FIG. 1) described previously.

Operation 212 may select an available network based on the network characteristics and current network and service information obtained in operation 202, and at least one of user preferences 214, application requirements 216 and system information 218. Operation 212 may be performed by wireless connectivity assistant 112 (FIG. 1). User preferences 214 may correspond with user preferences stored in element 116 (FIG. 1), application requirements 216 may correspond with application requirements stored in element 114 (FIG. 1) and system information 218 may correspond with system information stored in element 118 (FIG. 1).

Operation 220 initiates a communication session with the selected available communication network and services, and operation 222 communicates in accordance with the application. Operation 224 monitors current communication conditions and may select another communication link or another communication network and/or services as appropriate based on, for example, user preferences, application requirements and system information.

Thus, an improved wireless device that communicates more effectively and efficiently over the airwaves has been described. The wireless device may be a laptop or portable computer. A multi-channel radio controller within the wireless device characterizes available communication networks and/or services to determine network characteristics including current network and service information. Available communication networks may be characterized by monitoring traffic, using location information, interrogation or from current connectivity. A wireless connectivity assistant selects a communication network based on the network characteristics and at least one of user preferences, application requirements and system information. In one embodiment, the wireless device transitions between communication networks when a network or service becomes unavailable. In another embodiment, the wireless devices optimizes the wireless communications for the particular application.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for selecting a wireless local area network (WLAN) for communicating comprising:
    interrogating a first network with a first radio interface to determine a first network protocol associated with the first network and services hosted by the first network, the first network protocol having a data rate and packet error rate associated with the services hosted by the first network;
    interrogating a second network with a second radio interface to determine a second network protocol associated with the second network and services hosted by the second network, the second network protocol having a data rate and packet error rate associated with the services hosted by the second network;
    selecting either the first or second network based on application preferences for at least one application operating on a wireless communication device; and
    communicating with the selected network in accordance with the associated network protocol,
    wherein the radio interfaces provide a common application layer protocol to the radio controller,
    wherein the selecting comprises selecting either the first or second network based on the associated data rate and packet error rate approximating the preferred data rate and packet error rate for the at least one application, and
    wherein the applications comprise a voice communication application, a data communication application, and a video communication application, wherein the application preferences comprise a preferred data rate and packet error rate for the at least one application operating on the wireless communication device, and
    wherein communicating comprises interfacing, between the at least one application and one of the radio interfaces configured to communicate in accordance with the network protocol of the selected network, the interfacing being performed by a software agent.

2. The method of claim 1 wherein the first network protocol is a first wireless local area network (WLAN) protocol and the second network protocol is a second WLAN protocol, and wherein:
    when the at least one application includes a video communication application, selecting comprises selecting either the first or the second network that is providing a video communication service and having an associated data rate and packet error rate more closely matching a preferred bandwidth and packet error rate for video communications,
    when the at least one application includes a data communication application, selecting comprises selecting either the first or the second network that is providing a data communication service and having an associated data rate and packet error rate more closely matching a preferred bandwidth and packet error rate for data communications, and
    when the at least one application includes a voice communication application, selecting comprises selecting either the first or the second network that is providing a voice communication service and having an associated data rate and packet error rate more closely matching a preferred bandwidth and packet error rate for voice communications,
    wherein when the application comprises a video communication application, the application preferences include a packet error rate preference based on a display capability of the wireless communication device.

3. The method of claim 1 wherein interrogating comprises monitoring traffic on first and second networks to determine current network information, the current network information including the network protocol and services associated with the first and second networks.

4. The method of claim 1 wherein a first access point is associated with the first network and a second access point is associated with the second network, and wherein interrogating further comprises determining a geographic location of the first and second access points, determining a distance from the wireless communication station to each access point based on the location, and
    wherein selecting comprises selecting either the first of the second network based on the distance to the associated access point.

5. The method of claim 4 wherein determining the geographic location of the access points includes a triangulation of signals from the first and second networks.

6. The method of claim 1 wherein interrogating comprises sending a query to the first and second networks.

7. The method of claim 1 wherein selecting comprises selecting based on current network information includes at least one of bit-error-rate, bit-rate, packet size, network congestion, delay, security and cost for at least one of the networks.

8. The method of claim 1 further comprising:
    communicating with the selected network over a wireless link;

monitoring a quality of the wireless link during communicating;

selecting another wireless link with the selected network when the quality decreases; and switching to communicating with the another network.

9. A computer readable medium having program instructions stored thereon for performing a method of selecting a communication network when executed within a digital processing device, the method comprising:

interrogating a first network with a first radio interface to determine a first network protocol associated with the first network and services hosted by the first network, the first network protocol having a data rate and packet error rate associated with the services hosted by the first network;

interrogating a second network with a second radio interface to determine a second network protocol associated with the second network and services hosted by the second network, the second network protocol having a data rate and packet error rate associated with the services hosted by the second network;

selecting either the first or second network based on application preferences for at least one application operating on a wireless communication device; and communicating with the selected network in accordance with the associated network protocol, wherein the radio interfaces provide a common application layer protocol to the radio controller, wherein the selecting comprises selecting either the first or second network based on the associated data rate and packet error rate approximating the preferred data rate and packet error rate for the at least one application, and wherein the applications comprise a voice communication application, a data communication application, and a video communication application, wherein the application preferences comprise a preferred data rate and packet error rate for the at least one application operating on the wireless communication device, and wherein communicating comprises interfacing, between the at least one application and a radio interface configured to communicate in accordance with the network protocol of the selected network, the interfacing being performed by a software agent.

10. The computer readable medium of claim 9 wherein the first network protocol is a first wireless local area network (WLAN) protocol and the second network protocol is a second WLAN protocol, and wherein:

when the at least one application includes a video communication application, selecting comprises selecting either the first or the second network that is providing a video communication service and having an associated data rate and packet error rate more closely matching a preferred bandwidth and packet error rate for video communications, when the at least one application includes a data communication application, selecting comprises selecting either the first or the second network that is providing a data communication service and having an associated data rate and packet error rate more closely matching a preferred bandwidth and packet error rate for data communications, and when the at least one application includes a voice communication application, selecting comprises selecting either the first or the second network that is providing a voice communication service and having an associated data rate and packet error rate more closely matching a preferred bandwidth and packet error rate for voice communications, wherein when the application comprises a video communication application, the application preferences include a packet error rate preference based on a display capability of the wireless communication device.

11. The computer readable medium of claim 10 wherein a first access point is associated with the first network and a second access point is associated with the second network, and wherein interrogating further comprises determining a geographic location of the first and second access points, determining a distance from the wireless communication station to each access point based on the location, and wherein selecting comprises selecting either the first of the second network based on the distance to the associated access point.

12. The computer readable medium of claim 11 wherein interrogating comprises sending a query to-the first and second networks.

13. The computer readable medium of claim 12 wherein interrogating comprises maintaining a communication link with at least one of the networks.

14. A wireless communication device comprising:

a multi-protocol radio controller;

a plurality of separate radio interfaces to communicate with networks and to provide a common application layer protocol to the radio controller; and a wireless connectivity assistant, wherein the multi-protocol radio controller is to interrogate a first network with a first of the radio interfaces to determine a first network protocol associated with the first network and services hosted by the first network, the first network protocol having a data rate and packet error rate associated with the services hosted by the first network, wherein the multi-protocol radio controller is to interrogate a second network with a second of the radio interfaces to determine a second network protocol associated with the second network and services hosted by the second network, the second network protocol having a data rate and packet error rate associated with the services hosted by the second network, wherein the wireless connectivity assistant is to select either the first or second network based on application preferences for at least one application operating on a wireless communication device, and wherein one of the radio interfaces is to communicate with the selected network in accordance with the associated network protocol, wherein the radio interfaces comprise a plurality of wireless local area network radio interfaces and a short-range digital wireless interface, the radio interfaces to perform protocol specific operations and provide non-protocol specific signals to the radio controller, wherein the controller causes the radio interfaces to interrogate available networks to determine current network information, and wherein the wireless connectivity assistant is to select either the first or second network based on the associated data rate and packet error rate approximating the preferred data rate and packet error rate for the at least one application, wherein the applications comprise a voice communication application, a data communication application, and a video communication application, wherein the application preferences comprise a preferred data rate and packet error rate for the at least one application operating on the wireless communication device, and wherein the controller is to interface using a software agent between the at least one application and one of the radio interfaces configured to communicate in accordance with the network protocol of the selected network.

15. The communication device of claim 14 wherein the first network protocol is a first wireless local area network (WLAN) protocol and the second network protocol is a second WLAN protocol, and wherein:

when the at least one application includes a video communication application, the wireless connectivity assistant is to select either the first or the second network that is providing a video communication service and having an associated data rate and packet error rate more closely matching a preferred bandwidth and packet error rate for video communications, when the at least one application includes a data communication application, the wireless connectivity assistant is to select either the first or the second network that is providing a data communication service and having an associated data rate and packet error rate more closely matching a preferred bandwidth and packet error rate for data communications, and when the at least one application includes a voice communication application, the wireless connectivity assistant is to select either the first or the second network that is providing a voice communication service and having an associated data rate and packet error rate more closely matching a preferred bandwidth and packet error rate for voice communications, and wherein when the application comprises a video communication application, the application preferences include a packet error rate preference based on a display capability of the communication device.

16. The communication device of claim 14 wherein a first access point is associated with the first network and a second access point is associated with the second network, and wherein the controller is to determine a geographic location of the first and second access points, and is to determine a distance from the wireless communication station to each access point based on the location, and wherein the wireless connectivity assistant is to select either the first of the second network based on the distance to the associated access point.

17. The communication device of claim 14 wherein interrogating comprises sending a query to the first and second networks.

18. A wireless communication device comprising:
a multi-protocol radio controller;
a plurality of separate radio interfaces to communicate with networks and to provide a common application layer protocol to the radio controller; and
a wireless connectivity assistant,
wherein the multi-protocol radio controller is to interrogate a first network with a first of the radio interfaces to determine a first network protocol associated with the first network and services hosted by the first network, the first network protocol having a data rate and packet error rate associated with the services hosted by the first network, wherein the multi-protocol radio controller is to interrogate a second network with a second of the radio interfaces to determine a second network protocol associated with the second network and services hosted by the second network, the second network protocol having a data rate and packet error rate associated with the services hosted by the second network, wherein the wireless connectivity assistant is to select either the first or second network based on application preferences for at least one application operating on a wireless communication device, and wherein one of the radio interfaces is to communicate with the selected network in accordance with the associated network protocol, wherein the wireless connectivity assistant is to further select one of the networks based on current network information, wherein the current network information includes as least one of a bit-error-rate, packet size, network congestion, security, and cost for an available network, wherein the wireless connectivity assistant is to further select one of the networks based on user preferences, wherein the user preferences include at least one of a preferred network carrier, a tolerance to quality of service, a security level and power constraint, and wherein the application preferences include at least one of a bit-rate requirement, a quality of service requirement, a connection continuity requirement, and a security requirement, wherein the wireless connectivity assistant is to further select one of the networks based on system information, wherein the system information includes at least one of a power constraint, security requirement, processor speed, display resolution, processing capability, camera resolution, and audio capabilities.

19. The communication device of claim 18 wherein the controller causes at least one of the radio interfaces to maintain a communication link with an available network while interrogating.

20. A method performed by a wireless communication device for communicating in a wireless local area network comprising:

identifying, with more than one separate radio interface, services provided by one or more wireless local area networks hosted by one or more wireless access points, the services including at least one of a voice service, an internet access, and a data service; and selecting one of the networks and an associated service by matching application preferences with characteristics associated with the provided services, wherein the radio interfaces provide a common application layer protocol for each network, wherein identifying the services includes interrogating by sending a query to the one or more networks to determine the characteristics of the services including a network protocol, a data rate and packet error rate associated with the services, wherein the application preferences are associated with at least one application operating on the device of a plurality of applications, the applications comprising at least a voice communication application, a data communication application, and a video communication application, and wherein the application preferences comprise a preferred data rate and packet error rate for the applications, wherein when services are identified as provided by more than one wireless local area network, the method further comprises:

determining when at least two of the networks utilize either a same or an overlapping frequency band;

determining link degradation based on the utilization of the same or overlapping frequency bands; and selecting another of the networks when the link degradation results in either an unacceptably high bit-error-rate or an unacceptably low signal-to-noise ratio based on the application preferences.

21. The method of claim 20 further comprising refraining from selecting another of the networks when one of the networks utilizing either the same or overlapping frequency band is in a sleep mode.

22. A method performed by a wireless communication device for communicating in a wireless local area network comprising:

identifying, with more than one separate radio interface, services provided by one or more wireless local area networks hosted by one or more wireless access points, the services including at least one of a voice service, an internet access, and a data service; and selecting one of the networks and an associated service by matching application preferences with characteristics associated with the provided services, wherein the radio interfaces provide a common application layer protocol for each network, wherein identifying the services includes interrogating by sending a query to the one or more networks to determine the characteristics of the services including a network protocol, a data rate and packet error rate associated with the services, wherein the application preferences are associated with at least one application operating on the device of a plurality of applications, the applications comprising at least a voice communication application, a data communication application, and a video communication application, and wherein the application preferences comprise a preferred data rate and packet error rate for the applications, wherein when services are identified as provided by more than one wireless local area network, the method further comprises determining a distance from at least some of the network's transceivers, and based on the application preferences, selecting another one of the networks when either an unacceptably high bit-error-rate or an unacceptably low signal-to-noise ratio results because of the distance.

23. A method performed by a wireless communication device for communicating in a wireless local area network comprising:

identifying, with more than one separate radio interface, services provided by one or more wireless local area networks hosted by one or more wireless access points, the services including at least one of a voice service, an internet access, and a data service; and selecting one of the networks and an associated service by matching application preferences with characteristics associated with the provided services, wherein the radio interfaces provide a common application layer protocol for each network, wherein identifying the services includes interrogating by sending a query to the one or more networks to determine the characteristics of the services including a network protocol, a data rate and packet error rate associated with the services, wherein the application preferences are associated with at least one application operating on the device of a plurality of applications, the applications comprising at least a voice communication application, a data communication application, and a video communication application, and wherein the application preferences comprise a preferred data rate and packet error rate for the applications, wherein identifying services further includes determining a geographic location of the wireless communication device, and looking up services available at the determined geographic location in memory of the device.

24. The method of claim 23 wherein determining the location of the device includes receiving global positioning satellite signals.

25. The method of claim 23 wherein determining the location of the device includes performing triangulation techniques on signals from communication networks.

26. A method performed by a wireless communication device for communicating in a wireless local area network comprising:

identifying, with more than one separate radio interface, services provided by one or more wireless local area networks hosted by one or more wireless access points, the services including at least one of a voice service, an internet access, and a data service; and selecting one of the networks and an associated service by matching application preferences with characteristics associated with the provided services, wherein the radio interfaces provide a common application layer protocol for each network, wherein identifying the services includes interrogating by sending a query to the one or more networks to determine the characteristics of the services including a network protocol, a data rate and packet error rate associated with the services, wherein the application preferences are associated with at least one application operating on the device of a plurality of applications, the applications comprising at least a voice communication application, a data communication application, and a video communication application, and wherein the application preferences comprise a preferred data rate and packet error rate for the applications, wherein when the at least one application includes a video communication application, selecting comprises selecting a service and associated network that is providing a video communication service and having an associated data rate and packet error rate more closely matching a preferred bandwidth and packet error rate for video communications, wherein when the at least one application includes a data communication application, selecting comprises selecting a service and associated network that is providing a data communication service and having an associated data rate and packet error rate more closely matching a preferred bandwidth and packet error rate for data communications, and wherein when the at least one application includes a voice communication application, selecting comprises selecting a service and associated network that is providing a voice communication service and having an associated data rate and packet error rate more closely matching a preferred bandwidth and packet error rate for voice communications.

27. A wireless communication device for communicating in wireless local area networks comprising:

a radio controller;

a plurality of separate radio interfaces to identify services provided by one or more wireless local area networks hosted by one or more wireless access points, the services including at least one of a voice service, an internet access, and a data service, the radio interfaces to provide a common application layer protocol to the radio controller; and a wireless connectivity assistant to select one of the networks and an associated service by matching application preferences with characteristics associated with the provided services, wherein the interfaces are to interrogate the one or more networks by sending a query to determine the characteristics of the services including a network protocol, a data rate and packet error rate associated with the services, wherein the application preferences are associated with at least one application operating on the device of a plurality of applications, the applications comprising at least a voice communication application, a data communication application, and a video communication application, wherein the application preferences comprise a preferred data rate and packet error rate for the applications, wherein when services are identified as provided by more than one wireless local area network, wherein the wireless connectivity assistant is to determine when at least two of the networks utilize either a same or an overlapping frequency band, wherein the wireless connectivity assistant is to further determine link degradation based on the utilization of the same or overlapping frequency bands, and wherein the wireless connectivity assistant is to select another of the networks when the link degradation results in either an unacceptably high bit-error-rate or an unacceptably low signal-to-noise ratio based on the application preferences.

28. The wireless communication device of claim 27 wherein the wireless connectivity assistant is to refraining from selecting another of the networks when one of the networks utilizing either the same or overlapping frequency band is in a sleep mode.

29. A wireless communication device for communicating in wireless local area networks comprising:

a radio controller;

a plurality of separate radio interfaces to identify services provided by one or more wireless local area networks hosted by one or more wireless access points, the services including at least one of a voice service, an internet access, and a data service, the radio interfaces to provide a common application layer protocol to the radio controller; and a wireless connectivity assistant to select one of the networks and an associated service by matching application preferences with characteristics associated with the provided services, wherein the interfaces are to interrogate the one or more networks by sending a query to determine the characteristics of the services including a network protocol, a data rate and packet error rate associated with the services, wherein the application preferences are associated with at least one application operating on the device of a plurality of applications, the applications comprising at least a voice communication application, a data communication application, and a video communication application, wherein the application preferences comprise a preferred data rate and packet error rate for the applications, wherein when services are identified as provided by more than one wireless local area network, the wireless connectivity assistant is to determine a distance from at least some of the network's transceivers, and based on the application preferences, the wireless connectivity assistant is to select another one of the networks when either an unacceptably high bit-error-rate or an unacceptably low signal-to-noise ratio results because of the distance.

30. A wireless communication device for communicating in wireless local area networks comprising:

a radio controller;

a plurality of separate radio interfaces to identify services provided by one or more wireless local area networks hosted by one or more wireless access points, the services including at least one of a voice service, an internet access, and a data service, the radio interfaces to provide a common application layer protocol to the radio controller; and a wireless connectivity assistant to select one of the networks and an associated service by matching application preferences with characteristics associated with the provided services, wherein the interfaces are to interrogate the one or more networks by sending a query to determine the characteristics of the services including a network protocol, a data rate and packet error rate associated with the services, wherein the application preferences are associated with at least one application operating on the device of a plurality of applications, the applications comprising at least a voice communication application, a data communication application, and a video communication application, wherein the application preferences comprise a preferred data rate and packet error rate for the applications, wherein the wireless connectivity assistant is to determine a geographic location of the wireless communication device, and look up services available at the determined geographic location in memory of the device.

* * * * *